United States Patent
Malmskog et al.

(10) Patent No.: US 8,171,099 B1
(45) Date of Patent: *May 1, 2012

(54) NETWORK ACCELERATION DEVICE HAVING PERSISTENT IN-MEMORY CACHE

(75) Inventors: Steven A. Malmskog, San Jose, CA (US); Michel Hoche-Mong, San Jose, CA (US); Thomas Chang, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 12/717,740

(22) Filed: Mar. 4, 2010

Related U.S. Application Data

(63) Continuation of application No. 11/228,006, filed on Sep. 15, 2005, now Pat. No. 7,676,554.

(51) Int. Cl.
*G06F 15/167* (2006.01)

(52) U.S. Cl. ........ 709/213; 709/232; 709/234; 709/235; 709/219; 709/203

(58) Field of Classification Search .......... 709/217–219, 709/203, 212–216, 232, 234, 235
See application file for complete search history.

(56) References Cited

U.S. PATENT DOCUMENTS

| | | | |
|---|---|---|---|
| 4,558,413 A | 12/1985 | Schmidt et al. | |
| 5,088,036 A | 2/1992 | Ellis et al. | |
| 5,893,140 A | 4/1999 | Vahalia et al. | |
| 5,944,780 A | 8/1999 | Chase et al. | |
| 6,049,892 A | 4/2000 | Casagrande et al. | |
| 6,138,141 A | 10/2000 | DeSimone et al. | |
| 6,141,447 A | 10/2000 | Linzer et al. | |
| 6,389,460 B1 | 5/2002 | Stewart et al. | |
| 6,553,411 B1 | 4/2003 | Dias et al. | |
| 6,651,103 B1 | 11/2003 | Markowitz et al. | |
| 6,675,214 B2 | 1/2004 | Stewart et al. | |
| 6,813,690 B1 | 11/2004 | Lango et al. | |
| 7,113,962 B1 | 9/2006 | Kee et al. | |
| 7,243,136 B2 | 7/2007 | Huston et al. | |
| 7,286,476 B2 | 10/2007 | Helmy et al. | |
| 7,395,355 B2 | 7/2008 | Afergan et al. | |
| 7,644,108 B1 * | 1/2010 | Malmskog | 709/203 |
| 7,676,554 B1 * | 3/2010 | Malmskog et al. | 709/219 |
| 7,979,509 B1 * | 7/2011 | Malmskog et al. | 709/219 |
| 2002/0052914 A1 | 5/2002 | Zalewski et al. | |
| 2002/0069340 A1 | 6/2002 | Tindal et al. | |

(Continued)

OTHER PUBLICATIONS

Office Action from U.S. Appl. No. 12/651,897, dated Feb. 7, 2011, 14 pp.

(Continued)

*Primary Examiner* — Kenneth R Coulter
(74) *Attorney, Agent, or Firm* — Shumaker & Sieffert, P.A.

(57) ABSTRACT

A network acceleration device includes a persistent, in-memory cache of network content. For example, the cache may store content in a manner that allows a software process to map virtual memory to specific, known regions of an underlying physical memory. Upon detecting a failure of a process executing within the network device, the network acceleration device may restart the software process and remap data structures of the cache to the known regions of the physical memory without necessarily requiring that the cache content be reloaded from a non-volatile memory, such as a hard drive. In this manner, the network acceleration device may accelerate download speeds by avoiding timely cache content restoration in the event of a software process failure.

8 Claims, 11 Drawing Sheets

U.S. PATENT DOCUMENTS

| | | |
|---|---|---|
| 2003/0149581 A1 | 8/2003 | Chaudhri et al. |
| 2004/0003337 A1 | 1/2004 | Cypher |
| 2004/0098463 A1 | 5/2004 | Shen et al. |
| 2004/0230659 A1 | 11/2004 | Chase |
| 2005/0080876 A1 | 4/2005 | Peiffer et al. |
| 2005/0210084 A1 | 9/2005 | Goldick et al. |
| 2006/0167979 A1 | 7/2006 | Fuchs et al. |

OTHER PUBLICATIONS

Response to Office Action dated Feb. 7, 2011, from U.S. Appl. No. 12/651,897, filed Apr. 7, 2011 9 pp.

Office Action from U.S. Appl. No. 12/651,897, dated Oct. 18, 2010, 23 pp.

Response to Office Action dated Oct. 18, 2010, from U.S. Appl. No. 12/651,897, filed Jan. 18, 2011, 15 pp.

Shiflett, HTTP Developer's Handbook, Sams Publishing, 2003, 4 pp.

Wessels et al., "Application of Internet Cache Protocol (ICP), version 2," RFC 2187, Sep. 1997, 23 pp.

U.S. Appl. No. 11/227,980, by Steven A. Malmskog, filed Sep. 15, 2005.

U.S. Appl. No. 11/227,979, by Steven A. Malmskog, filed Sep. 15, 2005.

U.S. Appl. No. 11/651,897, by Steven A. Malmskog, filed Jan. 4, 2010.

Office Action from U.S. Appl. No. 11/227,980, dated Sep. 22, 2008, 18 pp.

Response to Office Action dated Sep. 22, 2008, filed Dec. 22, 2008, 15 pp.

Office Action from U.S. Appl. No. 11/227,980, dated Mar. 30, 2009, 13 pp.

Response to Office Action dated Mar. 30, 2009, filed Jun. 30, 2009, 12 pp.

Office Action from U.S. Appl. No. 11/227,980, dated Oct. 2, 2009, 16 pp.

Office Action from U.S. Appl. No. 11/227,979, dated Sep. 19, 2008, 19 pp.

Response to Office Action dated Sep. 19, 2008, from U.S. Appl. No. 11/227,979, filed Dec. 19, 2008, 16 pp.

Office Action from U.S. Appl. No. 11/227,979, dated Apr. 2, 2009, 18 pp.

Response to Office Action dated Apr. 2, 2009, from U.S. Appl. No. 11/227,979, filed Jul. 1, 2009, 17 pp.

Office Action from U.S. Appl. No. 11/227,979, dated Oct. 2, 2009, 22 pp.

Response to Office Action dated Oct. 2, 2009, from U.S. Appl. No. 11/227,979, filed Dec. 2, 2009, 17 pp.

Office Action from U.S. Appl. No. 11/227,979, dated Dec. 17, 2009, 24 pp.

Response to Office Action dated Dec. 17, 2010, from U.S. Appl. No. 11/227,979, filed Mar. 17, 2010, 16 pp.

Office Action from U.S. Appl. No. 11/227,979, dated Jun. 28, 2010, 20 pp.

Response to Office Action dated Jun. 28, 2010, from U.S. Appl. No. 11/227,979, filed Aug. 30, 2010, 14 pp.

Office Action from U.S. Appl. No. 11/227,451, dated Nov. 5, 2007, 20 pp.

Response to Office Action dated Nov. 5, 2007, from U.S. Appl. No. 11/227,451, filed Feb. 5, 2008, 15 pp.

Office Action from U.S. Appl. No. 11/227,451, dated Apr. 28, 2008, 23 pp.

Office Action from U.S. Appl. No. 11/227,451, dated Jul. 21, 2008, 25 pp.

Response to Office Actions dated Apr. 28 and Jul. 21, 2008, from U.S. Appl. No. 11/227,451, filed Sep. 22, 2008, 15 pp.

Office Action from U.S. Appl. No. 11/227,451, dated Dec. 31, 2008, 19 pp.

Response to Office Action dated Dec. 31, 2008, from U.S. Appl. No. 11/227,451, filed Apr. 30, 2009, 15 pp.

Notice of Allowance for U.S. Appl. No. 11/227,451, dated Aug. 26, 2009, 18 pp.

* cited by examiner

NETWORK ACCELERATION DEVICE HAVING PERSISTENT IN-MEMORY CACHE

This application is a continuation of U.S. application Ser. No. 11/228,006, filed Sep. 15, 2005, now U.S. Pat. No. 7,676,554, granted Mar. 9, 2010 the entire contents of which are incorporated herein by reference.

TECHNICAL FIELD

The invention relates to computer networks and, more particularly, to network acceleration devices within a computer network that cache network content.

BACKGROUND

In a typical network environment, client devices request and download content stored within network servers. Exemplary content includes web pages that may contain one or more of text, graphics, video, and sound data. Other examples of content include files, multimedia data streams (e.g., audio or video data streams), electronic messages, and data tables. Upon receiving the content requests, the network servers typically retrieve the requested content, break the requested content into packets, and transmit the packets to the requesting client device. Routers and other network infrastructure direct these packets through the network to the client devices, which, in turn, reconstruct the content from the packets and present the content to users via applications residing on the client devices.

The network may experience a variety of issues that result in decreased download speeds at the client devices. These issues include a large volume of content requests to a single network server that overload or otherwise diminish the capacity of the network server to timely service the requested content, network congestion, and limited network bandwidth. To increase download speeds, the network may employ one or more intermediate network acceleration devices located between the client devices and the servers to address the above listed issues or other issues that adversely effect download speeds. For example, a network acceleration device may compress the requested content before transmitting requested content to the client devices. As another example, a network acceleration device may cache content when a client device first requests the content. The network acceleration device may then intercept subsequent requests for that same content and provide the cached content to the requesting client devices, thereby avoiding additional accesses to the servers. In this manner, a network acceleration device may be employed to facilitate transactions between the client and network server to increase the overall efficiency of downloading content.

SUMMARY

In general, the principles of the invention relate to an improved network acceleration device.

In one aspect, the network acceleration device caches multiple "encodings" for the same network content, and intelligently provides the encodings based on the capabilities of the requesting client device. For example, during execution, the network acceleration device may receive one or more content requests from client devices, and the network acceleration device may service these requests. The content request may indicate various encodings of the content that the client device may accept, and the cache may store one or more of these encodings of the content. If the encoding is not stored within the cache, the network acceleration device may download the natural encoding of the content, encode the content into another acceptable encoding, and store this non-natural encoding to the cache. The network acceleration device may receive other requests for this content, and store other encodings of this content to the cache. Thus, the cache may store multiple encodings of content.

In some instances, each of the encodings may provide a smaller size than the natural encoding. Because the cache stores smaller file sizes, the network acceleration device may more quickly access requested content in comparison to downloading the content from a server and provide smaller encodings to facilitate decreased download speeds. The term "encodings" is used herein to refer to different cached instances generated from the same network content (i.e., the natural encoding). Examples of different encodings of the same network content include, but are not limited to, compressed and uncompressed instances of the content. Other examples include raw images and corresponding thumbnails, and complete web content and corresponding derived content reduced for display-limited devices having particular display requirements, such as personal digital assistants (PDAs), network-enabled cell phones, digital televisions or other devices.

In another aspect, the network acceleration device may simultaneously cache and intelligently serve different historical versions of network content. For example, the network device may receive one or more requests for original content; however, subsequent updates to the content may create varying versions of the content, e.g., a pre-update version and a post-update version. Client devices that requested the content prior to the update receive the pre-update version from the network acceleration device, which may have previously stored the pre-update version to the cache. Client devices that requested content after the update receive the post-update version from the network acceleration device, which may have also stored the post-update version to the cache. Moreover, the network acceleration device facilitates the simultaneous delivery of the pre-update version and the post-update version without waiting for delivery of the pre-update version to be complete. Thus, the network acceleration device may facilitate decreased download times by seamlessly and transparently providing both versions of the content simultaneously.

In yet another aspect, the network acceleration device may further facilitate download speeds by providing a cache that does not necessarily require content reloading after failure of a software process managing the cache. For example, the cache may store content in a manner that allows the software process to map virtual memory to specific, known regions of an underlying physical memory. Upon detecting a failure of a client session, the network acceleration device may restart the software process and remap data structures of the cache to the known regions of the physical memory. In this manner, the network device may facilitate decreased download speeds by avoiding timely cache content restoration from a static memory, such as a hard drive, in the event of a software process failure.

In another aspect, the network acceleration device may employ a communication protocol and optionally an application programming interface (API) that facilitates the sharing of cache resources among multiple network acceleration devices thereby allowing multiple acceleration devices to be clustered and share a common cache. For example, a first network acceleration device may receive a content request, and forward the content request to a second network acceleration device, which maintains the shared cache, via the API. The second network acceleration device receives the content request via the API and accesses the cache to determine whether the requested content resides within the cache. Upon determining that the content resides in the cache, the second network acceleration device may transmit the requested content from the cache to the first network acceleration device via the network or may directly provide the content to the requesting client. In this manner, this clustered approach may advantageously allow clients serviced by one network acceleration device to benefit from previous network access requests issued by clients serviced by a different network acceleration device. Moreover, the techniques may reduce the cost associated with these other network acceleration devices in comparison to the network acceleration device incorporating and maintaining the shared cache.

In one embodiment, a method comprises storing content of a cache within a named region of a physical memory provided by the network device, and mapping one or more data structures within the memory space associated with a software process executing on a network device to the named region of the physical memory. The method further comprises remapping the data structures to the named memory region of the physical memory in response to a failure of the software process, and accessing the content stored in the cache after the failure without restoring the content to the cache.

In another embodiment, a network device comprises an in-memory cache that stores content within a named region of a physical memory provided by the network device. The network device further comprises a cache server executing on the network device having a respective memory space. The cache server remaps one or more data structures of the memory space to the named memory region of the physical memory in response to a failure to allow access of the content stored in the cache without restoring the content to the cache.

In another embodiment, a computer-readable medium comprises instructions that cause a programmable processor to store content to a cache within a network device in accordance with a named memory region of the cache. The instructions further cause the programmable processor to detect a failure of a process executing within the network device, and remap the named memory region of the cache after detecting the failure to allow access of the content stored in the cache without restoring the content to the cache.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
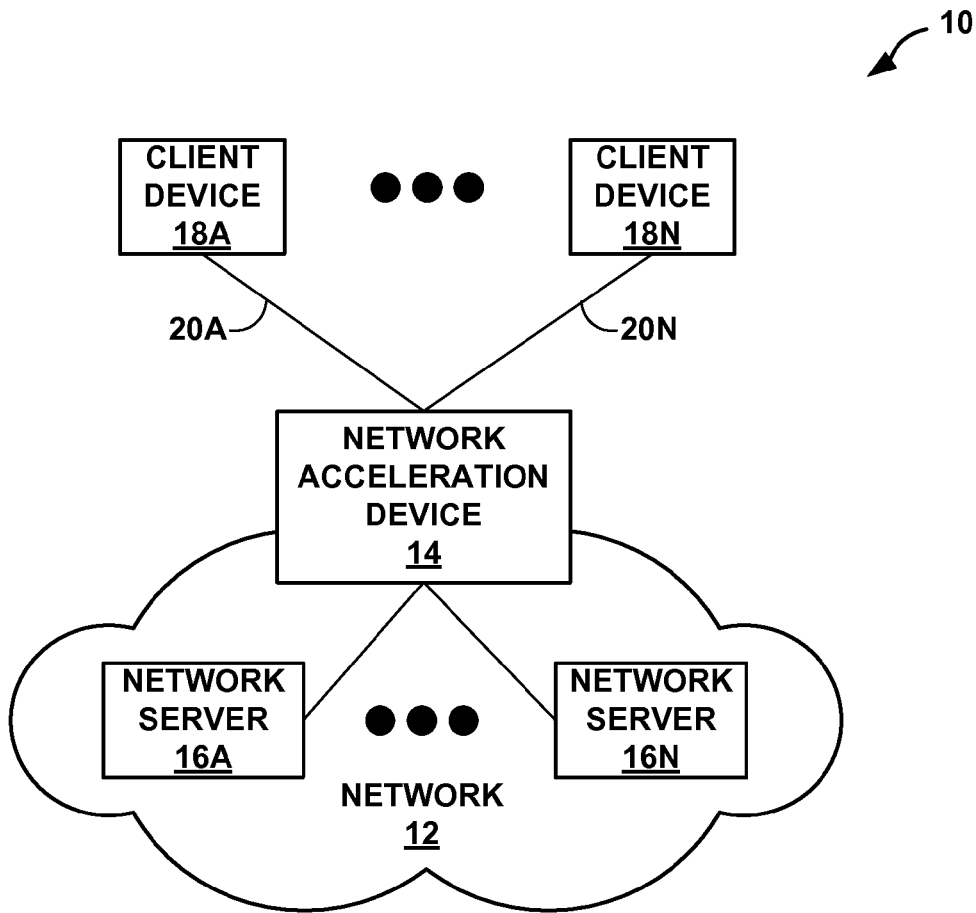
FIG. 1 is a block diagram illustrating an exemplary network system in which a network acceleration device operates in accordance with the principles of the invention.

FIG. 1 is a block diagram illustrating an exemplary network system 10 in which a network acceleration device 14 operates in accordance with the principles of the invention. In this example, network system 10 includes a network 12 that may represent an application service provider network, a customer network, a wide area network, a local-area network, or other common network types. Network 12 includes network acceleration device 14 located as an intermediate device between client devices 18A-18N ("client devices 18") and network servers 16A-16N ("network servers 16"). Network acceleration device 14 facilitates the accelerated transfer of content from network servers 16 to client devices 18 in accordance with the principles of the invention, as described below.

Network servers 16 may comprise web servers, mail servers, database servers, and other such common server types that store content, such as web pages, electronic messages, and data tables, respectively. Client devices 18 may comprise any number of personal computers, laptops, workstations, wireless devices, personal digital assistants (PDAs), cellular phones, network ready appliances, or other devices.

In the example of FIG. 1, network acceleration device 14 couples to client devices 18 via respective links 20A-20N ("links 20"). Although not shown, one or more networks may be located between client devices 18 and network acceleration device 14, and the client devices need not directly couple to the network acceleration device. These intermediate networks and network 12 may also include other network devices, such as routers, switches, hubs, gateways, session border controllers, VPN devices, and other network servers and network acceleration devices. While described herein in reference to network acceleration device 14, the principles of the invention may be applied to other devices, such as any of the network devices listed above.

Network 12 typically comprises a packet-based network capable of transmitting content from network servers 16 to client devices 18 via structured packets, and network acceleration device 14 may facilitate this transfer by caching content requested by the client devices. Thus, network acceleration device 14 comprises a cache (not shown in FIG. 1) that locally stores content received from network servers 16. The cache may comprise an in-memory cache, or, in other words, a cache that functions without relying exclusively on static memory, such as a hard drive, but within a dynamic memory, such as random access memory (RAM), dynamic RAM (DRAM), and synchronous DRAM (SDRAM).

The cache may store one or more "encodings" (or transforms) of content, and network acceleration device 14 intelligently provides the encodings based on the capabilities of the requesting client device. The term "encodings" is used herein to refer to different cached instances generated from the same network content (i.e., the natural encoding and some transformed version of the natural encoding). Examples of different encodings of the same network content include uncompressed (natural) HTML and compressed instances of the HTML content. Exemplary compression formats include PZIP, PZIP2, GZIP, and Deflate encodings, as well as, those other encodings described above. Other examples include raw images (i.e., the natural encoding in this case) and corresponding thumbnails, and regular web content and corresponding derived content for devices having particular display requirements, such as personal digital assistants (PDAs), network-enabled cell phones, digital televisions or other devices.

In general, client devices 18 transmit requests for content via links 20 to network acceleration device 14, and, in response to these content requests, network acceleration device 14 accesses its cache to determine whether the requested content resides locally within the cache, i.e., performs a cache lookup. The content requests issued by client devices 18 may comprise a HTTP GET request and may indicate the types of encodings client devices 18 may accept.

Upon determining acceptable encodings, network acceleration device 14 performs the cache lookup to determine if any of the acceptable encodings of the requested content are currently stored in the cache. If the cache determines that it is currently storing an acceptable encoding, i.e., a cache hit, the cache transmits the acceptable encodings to the requesting client devices 18 via links 20.

In addition, network acceleration device 14 may simultaneously cache and intelligently serve different historical versions of network content. For example, network acceleration device 14 may receive one or more requests for original content; however, subsequent updates to the content may create varying versions of the content, e.g., a pre-update version and a post-update version. Client devices 18 that requested the content prior to the update receive the pre-update version from the network acceleration device, which may have previously stored the pre-update version to the cache. Client devices 18 that requested content after the update receive the post-update version from the network acceleration device, which may have also stored the post-update version to the cache. Moreover, network acceleration device 14 facilitates the simultaneous deliver of the pre-update version and the post-update version without waiting for delivery of the pre-update version to be complete. Thus, network acceleration device 14 may facilitate decreased download times by seamlessly and transparently providing both versions of the content simultaneously.

In some embodiments, network acceleration device 14 maintains the integrity of this stored content despite failures of one or more internal software processes that manage the cache. For example, during the course of servicing content requests, network acceleration device 14 may detect a failure of one or more internal software processes that manage the in-memory cache. However, as further described below, network acceleration device 14 may store the cached content in memory in a manner that allows the software process to map virtual memory of its process space to specific, known regions of an underlying physical memory. Upon detecting a failure of a software process, which typically results in corruption of the virtual memory space, the network acceleration device restarts the software process and remaps data structures of the cache to the known regions of the physical memory. Thus, network acceleration device 14 is able to continue to access its cache after detecting the failure without reloading the contents stored in the cache prior to the failure even though the cache is an in-memory cache. Thus, the in-memory cache may maintain a quasi-persistent nature in that the cache remains functional even after a software process failure that would normally cause conventional devices to reload the contents of the cache from a hard drive, or some other static memory source.

In this manner, network acceleration device 14 provides a quasi-persistent in-memory cache capable of storing multiple encodings of content, as well as, multiple encodings and historical versions of the content. The cache may enable network acceleration device 14 to more quickly provide content to client devices 16. For example, some of the encodings are frequently smaller in size than the natural content, thereby decreasing the time necessary for client devices 18 to download the requested content. Further, because network acceleration device 14 may store multiple historical versions of content, network acceleration device 14 may continue to transmit a first version of the content to one of client devices 18 and need not interrupt this transmission to replace the first version with the second version of the content. Thus, network acceleration device 14 may more quickly service simultaneous content requests concerning different versions of the same content. Finally, network acceleration device 16 may more quickly service content requests during a failure of a software process within network acceleration device 16 because network acceleration device 16 need not reload, or repopulate, the cache after the failure, as described above.

Figure 2:
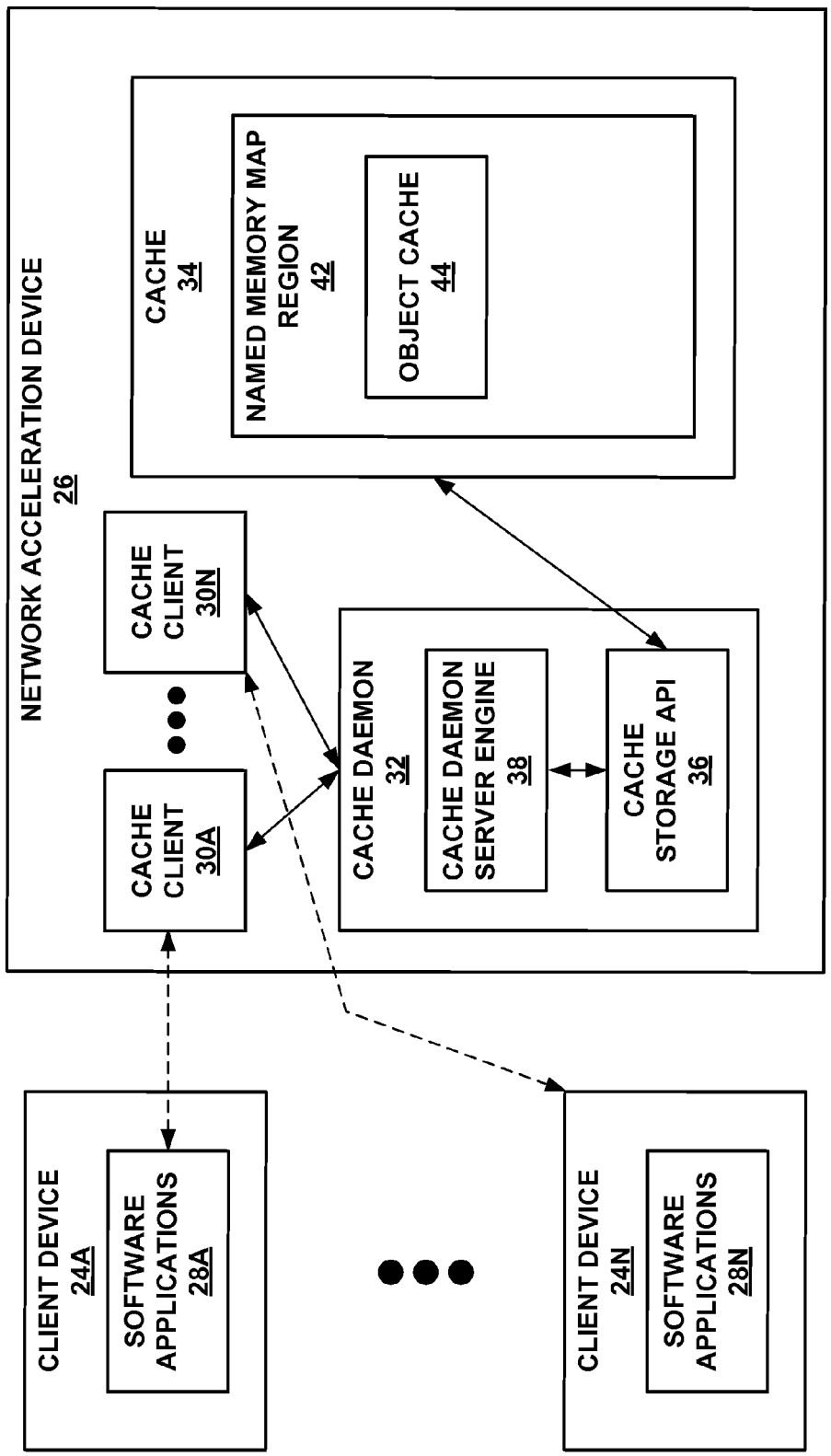
FIG. 2 is a block diagram illustrating an example embodiment of a network acceleration device in more detail.

FIG. 2 is a block diagram illustrating an exemplary network system 22 in more detail. Network system 22 may be substantially similar to network system 10 of FIG. 1, and comprises client devices 24A-24N ("client devices 24") and a network acceleration device 26, where client devices 24 couples to network acceleration device 26, much like client devices 18 and network acceleration device 14 of network system 10. Network acceleration device 26 may accelerate the download of content by client devices 24, thereby decreasing the time necessary to download the content in accordance with the principles of the invention, described herein.

Client devices 24 may comprise substantially similar client devices, and, for ease of illustration, only the components of client devices 24A are discussed herein; however, each of client devices 24 may comprise similar components. Client device 24A comprises one or more software applications 28A that request content from servers. Software applications 28A typically include one or more of a web browser, such as Internet Explorer, Netscape Navigator™, and Mozilla Firefox™; an email application, such as Microsoft™ Outlook Express or Microsoft Outlook, or any other common network application.

Network acceleration device 26 represents any intermediate network device capable of facilitating the download of content by client devices 24. Network acceleration device 26 comprises a plurality of cache clients 30A-30N ("cache clients 30"), a cache daemon 32 and a cache 34. Cache clients 30 and a cache daemon 32 may execute as separate software processes within an operating environment provided by an operating system and one or more microprocessors (not shown in FIG. 2) of network acceleration device 26. In some embodiments, cache clients 30 may execute as separate process threads within another process, such as cache daemon server engine 32, or, in other embodiments, cache clients 30 may comprise data structures within another process. In yet other embodiments, cache clients 30 may comprise data structures that execute within the operating system itself. In the embodiments where cache clients 30 comprise data structures, these data structures may store state information regarding connections with client devices 24 and request information so as to attempt to fulfill any received client requests. For ease of illustration, cache clients 30 are discussed herein in reference to separate processes; however, the principles of the invention should not be limited as such. Cache clients 30 and cache daemon 32 may comprise executable instructions that cause a processor to perform actions attributable to the principals of the invention as described herein, and may be stored in any suitable computer-readable media.

Cache clients 30 intercept content requests from clients 24 and interact with cache daemon 32 in accordance with a request and response model. Cache daemon 32 serves as a broker for cache 34 or, in other words, cache daemon 32 regulates access to cache 34 by selectively servicing cache access requests from cache clients 30.

In one embodiment, cache daemon 32 includes an application programming interface 36 ("cache storage API 36") and a cache daemon server engine 38. Cache storage API 36 enables cache daemon server engine 38 to access cache 34 on behalf of requesting cache clients 30. Cache daemon server engine 38 may operate in accordance with one or more state machines (not shown in FIG. 2) to service requests from cache clients 30 and may further operate in such a manner as to minimize locking requirements during concurrent operations within cache 34. Cache storage API 36 may provide a set of functions that allow for cache manipulations, which include accessing an object in the cache, inserting an object, and retrieving cache statistics. As described in further details below, cache daemon server engine 38 may accept cache messages via a cache message protocol, which may utilize a transport control protocol (TCP), thereby allowing cache clients 30 to execute on other network acceleration devices within a cluster and interact with cache daemon 32 over a network medium to share access to cache 34.

In one embodiment, cache 34 comprises a named memory map region 42 that contains objects, as represented by object cache 44 in FIG. 2, that reference the physical memory of cache 34. For purposes of this invention, objects represent general purpose data structures capable of storing references (e.g., pointers) to other objects and data buffers, as well as, data in the form of variables, and other such common data storage forms. Object cache 44 may also store object metadata, which may include information about object sizes, values corresponding to how many times particular objects have been referenced, and other information pertinent to caching algorithms.

Named memory map region 42 may represent a form of cache storage that allows cache daemon 32 to map virtual memory of its process space to specific, known regions of an underlying physical memory. In other embodiments, named memory map region 42 may represent a form of cache storage that allows cache daemon 32 to map physical memory, as opposed to virtual memory, reserved for cache operation to specific, known regions of the underlying physical memory. In this manner, named memory region 42 allows cache 34 to maintain a quasi-persistent nature, as described in more detail below, in the event cache daemon 32 or other software process within network acceleration device 26 fails. Cache 34 may comprise an in-memory cache or, in other words, a cache contained at least partially within dynamic memory, such as RAM, DRAM, SDRAM, and partially independent of static memory, such as hard drives and flash memory.

Generally, software applications 28 of client device 24A issue content requests, which are intercepted by network acceleration device 26. Upon intercepting the requests, network acceleration device 26 spawns a new cache client 30 to service the requests. Alternatively, network acceleration device 26 may utilize an existing cache client 30 to service the request. In any event, the cache client 30 servicing the requests interacts with cache daemon 32 via cache daemon server engine 38, which, in turn, passes any necessary information for determining whether the requested content is stored within cache 34 via cache storage API 36. The information may include the name of the content requested, such as an HTTP address, universal resource locator (URL) or universal resource identifier (URI), as well as, encodings software applications 28 accepts, and other such information necessary to access cache 34.

Cache daemon server engine 38 may first decide to accept or deny the content request, but upon acceptance, cache daemon server engine 38 performs a cache lookup via cache storage API 36 by formulating a query based on the information received from the requesting cache client 30. For example, cache daemon server engine 38 may formulate a query requesting a specific encoding of the content by including a cache key based on the HTTP address and the particular encoding.

Cache 34 receives the query and performs the cache lookup to determine whether the requested content resides within cache 34, as described below in more detail. Upon a determination that the requested content resides within cache 34, i.e., a cache hit, cache 34 returns a token to cache daemon server engine 38 via cache storage API 36. Cache daemon server engine 38 begins reading the requested content from cache 34 based on the token, which may comprise a pointer that references the requested content. Cache daemon server engine 38 next transmits this requested content to the requesting cache client 30, which forwards the requested content to software applications 28.

However, if cache the requested content does not reside within cache 34, i.e., a cache miss, cache daemon server engine 38 informs the requesting cache client 30 of the cache miss. The requesting cache client 30 may, next, request this content from an appropriate network server, such as one of network servers 16 (FIG. 1). Typically, the requesting cache client 30 requests only the natural encoding, e.g., HTTP encoding, of the content from the appropriate network server, and network acceleration device 26 may employ a compression module (not shown in FIG. 2) that automatically transforms the natural content into one of the encodings software applications 28 may accept. Upon receiving the content from the network server and encoding the content, the appropriate cache client 30 may simultaneously maintain three sessions. For example, the cache client 30 may maintain a first server session with the appropriate network server to download the requested content, a second client session with software applications 28 to forward the encoded requested content to software applications 28, and a third cache session with cache daemon 32 to insert the encoded requested content into cache 34.

Moreover, although not illustrated in FIG. 2, network acceleration device 26 may include a multiplex/demultiplex process by which two or more cache clients 30 may share one or more communications sessions (e.g., HTTP sessions) with a server, thereby reducing the number of open sessions maintained by the server.

Throughout the above described process, named memory map region 42 of cache 34 provides a caching mechanism to ensure its quasi-persistent nature. In particular, named memory map region 42 resides in the virtual memory associated with the process space of cache daemon 32 and is utilized to maintain object cache 44 within specific physical memory regions, as discussed below in more detail. In the event that cache daemon 32 fails while accessing cache 34 via cache daemon 32, network acceleration device 26 may simply restart cache daemon 32 and remap the data structures associated with cache 32 to named memory map region 42. This allows cache daemon 32 to continue to utilize cache 34 without necessarily repopulating cache 34 even though the original process space associated with cache daemon 32 may have been lost. Thus, because named memory map region 42 provides cache 34 with references via object cache 44 to the physical memory of cache 34, cache 34 may maintain a quasi-persistent nature by remapping objects within object cache 44 to the physical memory upon failure, unlike conventional caches that require repopulation of the cache after detecting a failure of a client session.

Figure 3:
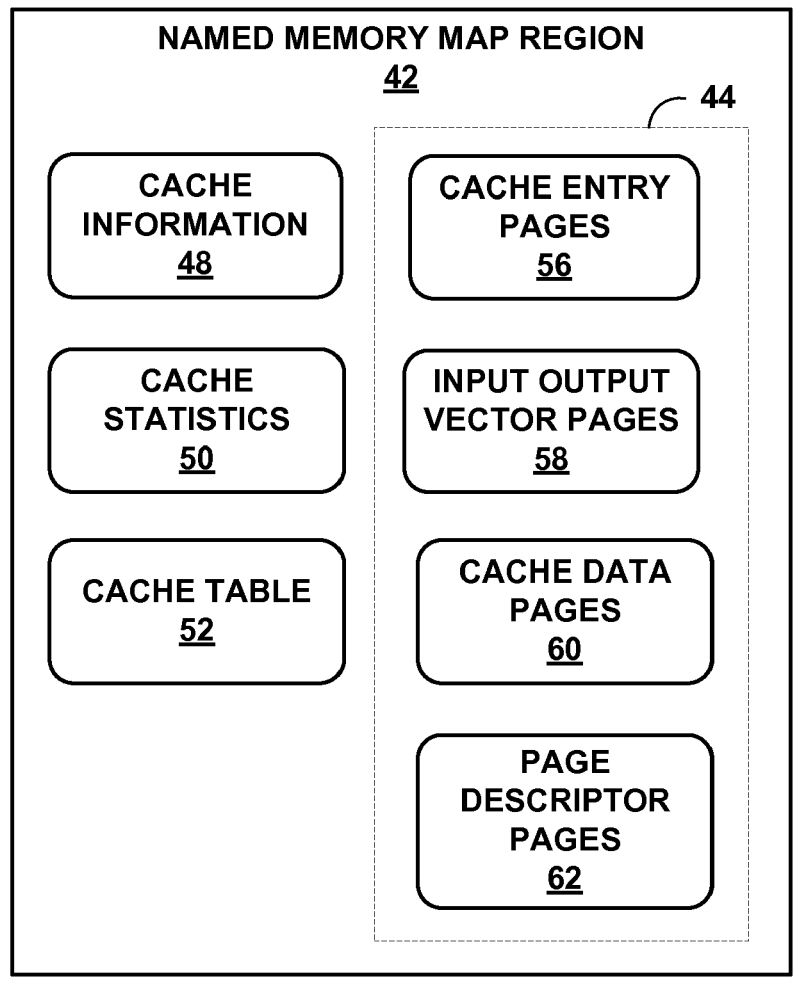
FIG. 3 is a block diagram illustrating an example organization of named memory map region of FIG. 2 in more detail.

FIG. 3 is a block diagram illustrating an example organization of named memory map region 42 of FIG. 2 in more detail. Named memory map region 46 is discussed herein in reference network acceleration device 26; however, named memory map region 46 may reside within a cache included within any of the network devices listed above, and the principles of the invention should not be limited as such.

Named memory map region 42 may represent a form of cache storage that allows a cache daemon, such as cache daemon 32, to map virtual memory of its process space to specific, known regions of an underlying physical memory, as described above. While named memory map region 42 comprises objects that reference the underlying physical memory of cache 34, named memory map region 42 may also comprise other forms of data to enable efficient operation of cache 34. As shown in FIG. 3, named memory map region 42 comprises cache information 48 and cache statistics 50 to facilitate efficient operation of cache 34. Cache information 48 may store low-level cache information, such as information relating to the size, remaining available space, and other such information relevant to a cache, such as cache 34 of FIG. 2. Cache statistics 50 may store statistical information relevant to the cache, such as the number and frequency of cache misses, the number and frequency of cache hits, and other such statistical information relevant to cache 34.

In this example, named memory map region 46 also comprises cache table 52 and object cache 44 that includes cache entry pages 56, input output vector pages 58, cache data pages 60, and page descriptor pages 62. Cache table 52 may comprise a data structure, such as a linked-list, a tree, or hash table, to store header objects representing the rows for each line of the cache and referencing various objects stored within object cache 44, shown as the dashed box in FIG. 3. Cache entry pages 56 may store pages of entry objects that enable the cache, e.g., cache 34, to access data objects. Input output vector pages 58 may store data objects that further enable the cache to access data buffers. Cache data pages 60 may store pages of data buffers that hold the stored content. Finally, page descriptor pages 62 may store information describing the pages of cache data pages 60.

While most of these components of named memory map region 46 are discussed in more detail below, generally, cache table 52 maintains the structure of the cache by utilizing the header objects to indicate each line of the cache. The header objects comprises references (e.g., pointers) to the entry objects stored in cache entry pages 56, and the cache entry objects may reference the data objects of input output vector pages 58. The data reference objects may reference the data buffers of cache data pages 60 that store the requested content, including multiple encodings and versions of the identical requested content. Named memory map region 42 utilizes page descriptor pages 62 to properly manage cache data pages 60. In order to maintain consistent reference of the underlying physical memory as referenced by named memory map region 42, cache data pages 60 may comprise a buffer allocator, as described below, to properly allocate data buffers, i.e., the underlying physical memory, within cache 34. In other words, the buffer allocator ensures that named memory map region 42 consistently references the same underlying physical memory of cache 34 in the event of remapping named memory map region 42 upon failure of a process, such as cache daemon 32, of network acceleration device 26.

In the event that cache daemon 32, for example, fails, network acceleration device 26 restarts cache daemon 32, which determines whether to reload the contents of cache 34 upon restarting. Typically, contents within cache 34 are not corrupted, and, thus, cache daemon 32 does not reload the contents, but only remaps the objects within named memory map region 42. Cache daemon 32 consistently remaps the objects to the same underlying physical memory as before the failure. In doing so, cache daemon 32 maintains the quasi-persistent nature of cache 34 because, after remapping the objects, cache daemon 32 may resume servicing cache access requests without reloading the contents of cache 34. Thus, named memory map region 42, as described in more detail below, comprises these components to facilitate decreased download speeds and provide for the quasi-persistent nature of cache 34, in accordance with the principles of the invention.

Figure 4:
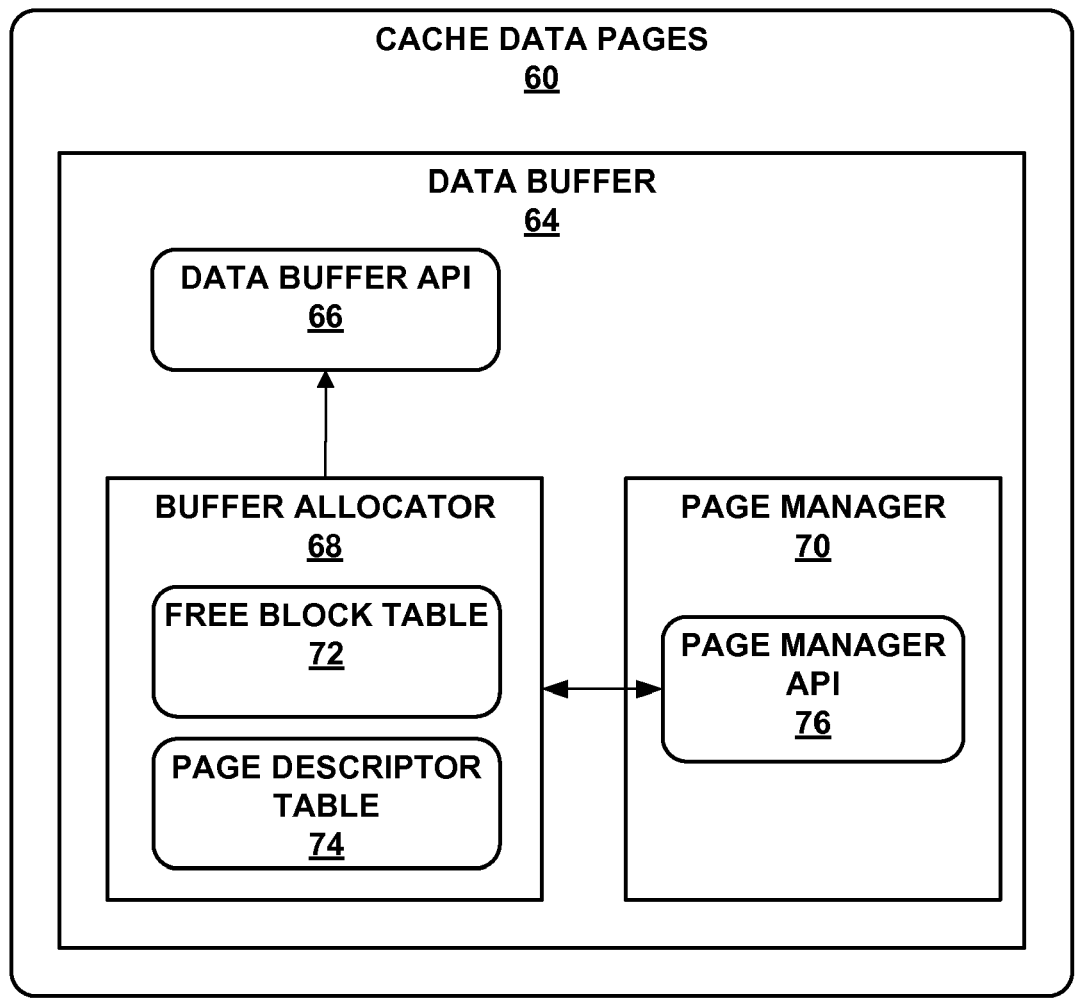
FIG. 4 is a block diagram illustrating an example embodiment of cache data pages of FIG. 3 in more detail.

FIG. 4 is a block diagram illustrating an example embodiment of cache data pages 60 of FIG. 3 in more detail. As shown in FIG. 4, cache data pages 60 comprises data buffer 64, which may store both populated data buffers and free, or unpopulated, data buffers. Data buffers 64 comprises a data buffer application programming interface 66 ("data buffer API 66"), a buffer allocator 68, and a page manager 70. Data buffer API 66 may include an API suitable for communicating with buffer allocator 68, where buffer allocator 68 receives requests to allocate new data buffers via data buffer API 66. Buffer allocator 68 comprises an exemplary free block table 72 and an exemplary page descriptor table 74. Free block table 72 stores references to free data buffers within cache data pages 60. Page descriptor table 74 stores references to free pages within page descriptor pages 62. Page manager 70 comprises a page manager application programming interface 76 ("page manager API 76") that enables buffer allocator 68 to communicate with page manager 70.

Typically, upon a cache miss, cache daemon server engine 38 informs the requesting cache client 30 of the cache miss, and the requesting cache client 30 requests the requested content from a network server, such as one of network servers 16 of FIG. 1. After receiving the content, cache client 30 communicates the content within cache messages to cache daemon server engine 38 via a cache message protocol. Upon receiving these cache messages, cache daemon server engine 38 writes the content to cache 34 via cache storage API 36. Upon initiating the write, cache 34 allocates the necessary space within data buffer 64 of cache data pages 60 to accommodate the content via interaction with buffer allocator 68. Buffer allocator 68 allocates a data buffer by consulting free block table 72 and communicates with page manager 70 via page manager API 76 to retrieve the page upon which the selected free buffer resides. Page manager 70 determines the page upon which the free buffer resides, and returns a reference to this page to buffer allocator 68. Buffer allocator 68 updates page descriptor table 74 to reflect the allocation of the selected data buffer from within the determined page, and returns a reference, e.g., pointer, to the selected data buffer to cache daemon server engine 38 via data buffer API 66 and cache storage API 36. Cache daemon server engine 38 utilizes this reference to write the content received via the cache messages to the data buffer, i.e., the underlying physical memory of cache 34, referenced by the pointer.

In the event of failure of one of the process, such as cache daemon 32, executing within network acceleration device 26, cache daemon 32, upon restart, may remap named memory map region 42 so as to reference the same underlying physical memory as before the failure and as described above. Buffer allocator 68 may facilitate the remap of named memory map region 42 by allocating data buffers in a consistent and orderly manner, such that, upon remapping named memory map region 42, cache daemon 32 may perform the remap without relying upon buffer allocator 68. In this manner, buffer allocator 68 does not allow for inconsistent mapping of named memory map region 42, thereby facilitating the quasi-persistent nature of cache 34.

Figure 5:
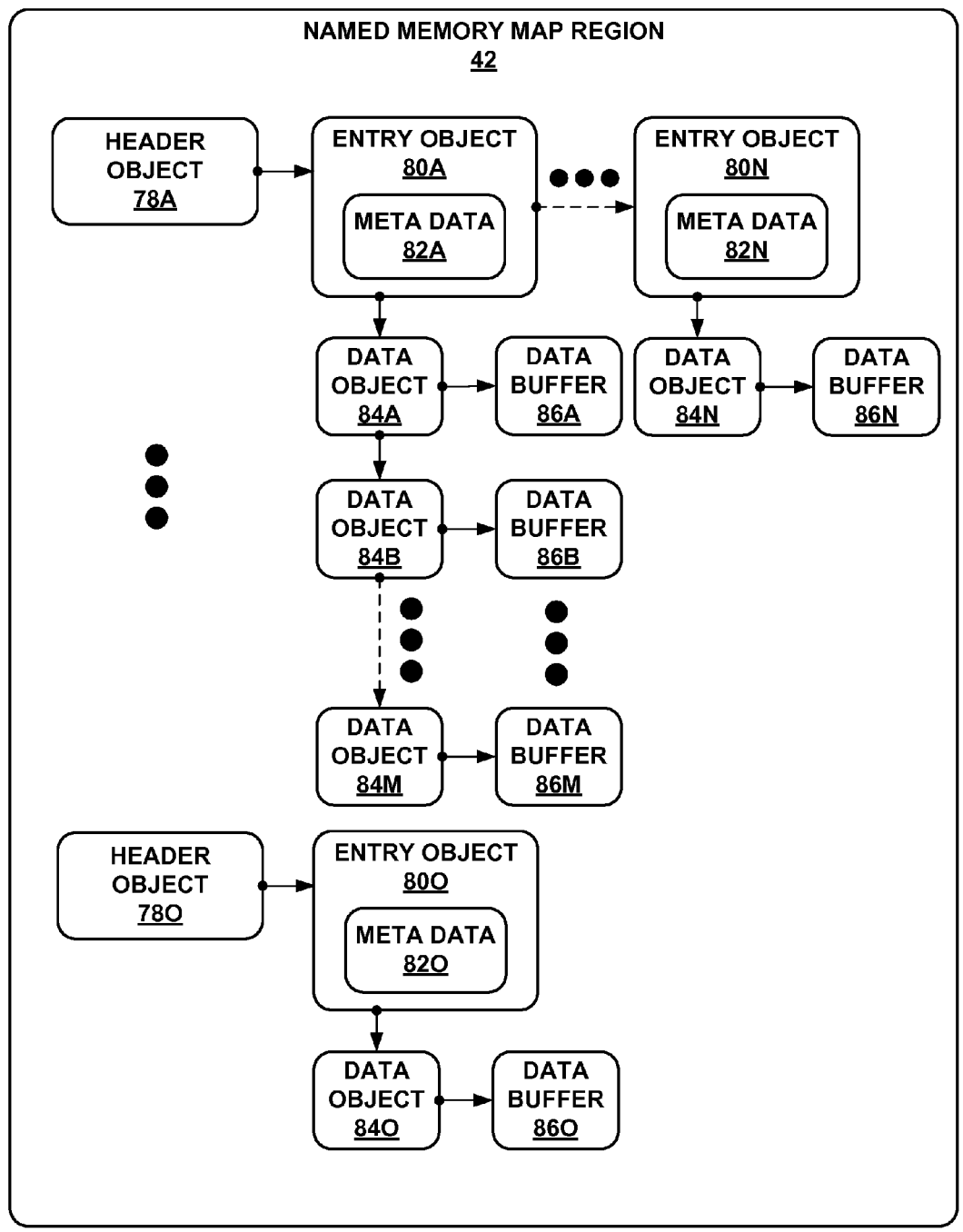
FIG. 5 is a block diagram illustrating an example organization of the named memory map region of FIG. 3 in more detail.

FIG. 5 is a block diagram illustrating an example organization of named memory map region 42 of FIG. 3 in more detail, wherein FIG. 5 depicts the organization of the various objects discussed above. As illustrated in FIG. 5, named memory map region 42 comprises header objects 78A-78O ("header objects 78") and entry objects 80A-80 ("entry objects 80"), where header object 78A comprises a reference, e.g., pointer, to entry object 80A and header object 78O comprises a pointer to entry object 80O. Cache table 52 may comprise header objects 78, and cache entry pages 56 may comprise entry objects 80. Entry objects 80A-80N form an entry object chain, as represented by the dotted arrow between entry object 80A and entry object 80N in FIG. 5. The dotted arrow indicates that each of entry objects 80 point to the next one of entry objects 80 until ending at entry object 80N. Each of entry objects 80 further comprise respective meta data 82A-82O ("meta data 82"), which, as described above, may include information about object sizes, values corresponding to how many times particular objects have been referenced, and other information pertinent to caching algorithms.

Named memory map region 42 further comprises data objects 84A-84O ("data objects 84") that each reference respective data buffers 86A-86O ("data buffers 86"), i.e., the underlying physical memory of cache 34. Input output vector pages 58 may comprise data objects 84, and cache data pages 60 may comprise data buffers 86. Data objects 84 may also form a linked list structure, as represented by the dotted line between data object 84B and data object 84M, which indicates that data object 84B comprises a pointer to data object 84C and continuing in this fashion until reaching the last data object, i.e., data object 84M, thereby forming a data object chain. While discussed in reference to chains or linked lists, named memory map region may employ other data structures, such as trees, hash tables, and queues, to implement the organization of entry objects 80A-80N data objects 84A-84M, and the invention should not be limited as such.

In general, upon receiving a content request from one of client devices 18 and spawning a respective one of cache clients 30 to service the request, the newly spawned cache client 30 may cause cache daemon server engine 38 to perform a cache lookup by issuing a query based on information contained within the content request to cache 34. Upon receiving the query, cache 34 performs the cache lookup by traversing header objects 78 within named memory map region 42 until selecting one of header objects 78 that matches the query. For example, named memory map region 42 may be accessible via a name, e.g., HTTP address and an encoding type, all of which the query may indicate by way of providing cache 34 with a cache key. Cache 34 may traverse header objects 78 until finding an appropriate row that possibly contains content having the same HTTP address and encoding specified by the query via the cache key. Next, cache 34 follows reference of the selected one of header objects 78 to a respective one of entry objects 80; however, in the event the selected one of header objects 78 does not point to one of entry objects 80, cache 34 may respond to cache daemon server engine 38 that the content is not stored within named memory map region 42, i.e., a cache miss has occurred.

However, if the selected one of header objects 78 does point to one of entry objects 80, cache 34 begins to traverse the entry object chain until finding the appropriate one of entry objects 80, as determined, again, by the query. For example, cache 34 may traverse entry objects 80 and select one of entry objects 80 upon finding one of entry objects 80 that contain information matching the HTTP address and encoding as that specified by the query. If cache 34 does not find an appropriate one of entry objects 80, as determined based on the query, cache 34 responds to cache daemon server engine 38 that a cache miss has occurred. However, if cache 34 finds an appropriate one of entry objects 80, cache 34 follows the reference to an associated one of data objects 84.

Barring a cache miss, cache 34 traverses data objects 84 until selecting one or more of data objects 84 that match the query, as discussed above. If cache 34 reaches the end of a data object chain, such as data object 84M, without selecting one of data objects 84, cache 34 informs cache daemon server engine 38 that a cache miss has occurred. However, if cache 34 selects one of data objects 84, i.e., a cache hit, cache 34 follows the reference associated with the selected one or more of data objects 84 to a respective one or more of data buffers 86. Cache 34 returns a token, e.g., pointer, to the appropriate entry object 80, begins to reads the contents from the respective one of data buffers 86, and returns the contents to cache daemon server engine 38, which, in turn, passes the contents to the requesting cache client 30. Upon receiving the content, the requesting cache client 40 formats the contents into packets and transmits the packets to the requesting application, such as one of software applications 28.

Throughout this process a cache miss may occur, as indicated above, and, in the event of a cache miss, cache daemon server engine 38 informs the requesting cache client 30 of the cache miss. The requesting cache client 30 may request the content from an appropriate network server, download the content from the network server, and forward the content to the requesting one of software applications 28. The requesting cache client 30 may simultaneously insert the content into cache 34 by requesting access to cache 34 via cache messages transmitted in accordance with a cache message protocol to cache daemon server engine 38. Cache daemon server engine 38 typically grants access, receives the content from the requesting cache clients 30, and formulates a query to determine an appropriate location within cache 34 to store the content. After receiving the query, cache 34 may create a new entry object within named memory map region 42 and return a token, i.e., pointer, to the new entry object. Cache 34 may further allocate a new data buffer, similar to one of data buffers 86, by way of a buffer allocator, such as buffer allocator 68 of FIG. 4, and create the necessary data object to reference this newly allocated data buffer. Cache 34 may map the entry object to the data buffer, thereby completing the mapping and maintaining named memory map region 42 in a consistent manner.

Upon receiving the token, cache daemon server engine 38 may use the token to reference the underlying physical memory of cache 34, i.e., the newly allocated data buffer, and write the content received from the requesting cache clients 30 to this newly allocated data buffer via cache storage API 36. In some embodiments, the requesting cache client 30 may encode the content to a non-natural encoding prior to writing the contents to the newly allocated data buffer. In some instances, a cache miss may occur because named memory map region 42 does not contain a particular encoding of the content, but contained another encoding of the content that the application could not accept. Thus, the requesting cache client 30 may write this encoded content to cache 34 even though cache 34 stores another encoding of the same content.

In instances where a previous encoding of the content already exists within cache 34, cache 34 may traverse to the appropriate one of entry objects 80, but does not necessarily traverse any of data objects 84 associated with the appropriate one of entry objects 80. Instead, cache 34 creates a new data object that comprises a pointer to the newly allocated data buffer and writes the requested content to an associated data buffer. Thus, data objects 84A-84M point to respective data buffers 86A-86M, where one or more of data buffers 86A-86M store a different encoding of the same content. In this manner, named memory map region 42 may store multiple encodings of the same content to facilitate the download of content.

Moreover, because named memory map region 42 comprises the various objects discussed above, cache 34 may maintain a quasi-persistent nature because of the consistent allocation of data buffers 84 by buffer allocator 68. In particular, upon failure of a process, such as cache daemon 32, within network acceleration device 26, cache daemon 32, upon restart, may remap header objects 78, entry objects 80, and data objects 84 to reference the same data buffers 86 as before the failure without reloading the contents to data buffers 86. Thus, in employing named memory map region 42, cache 34 may remain persistent despite failure of a process executing within network acceleration device 26 because of the consistent named allocation of data buffers 86.

Figure 6:
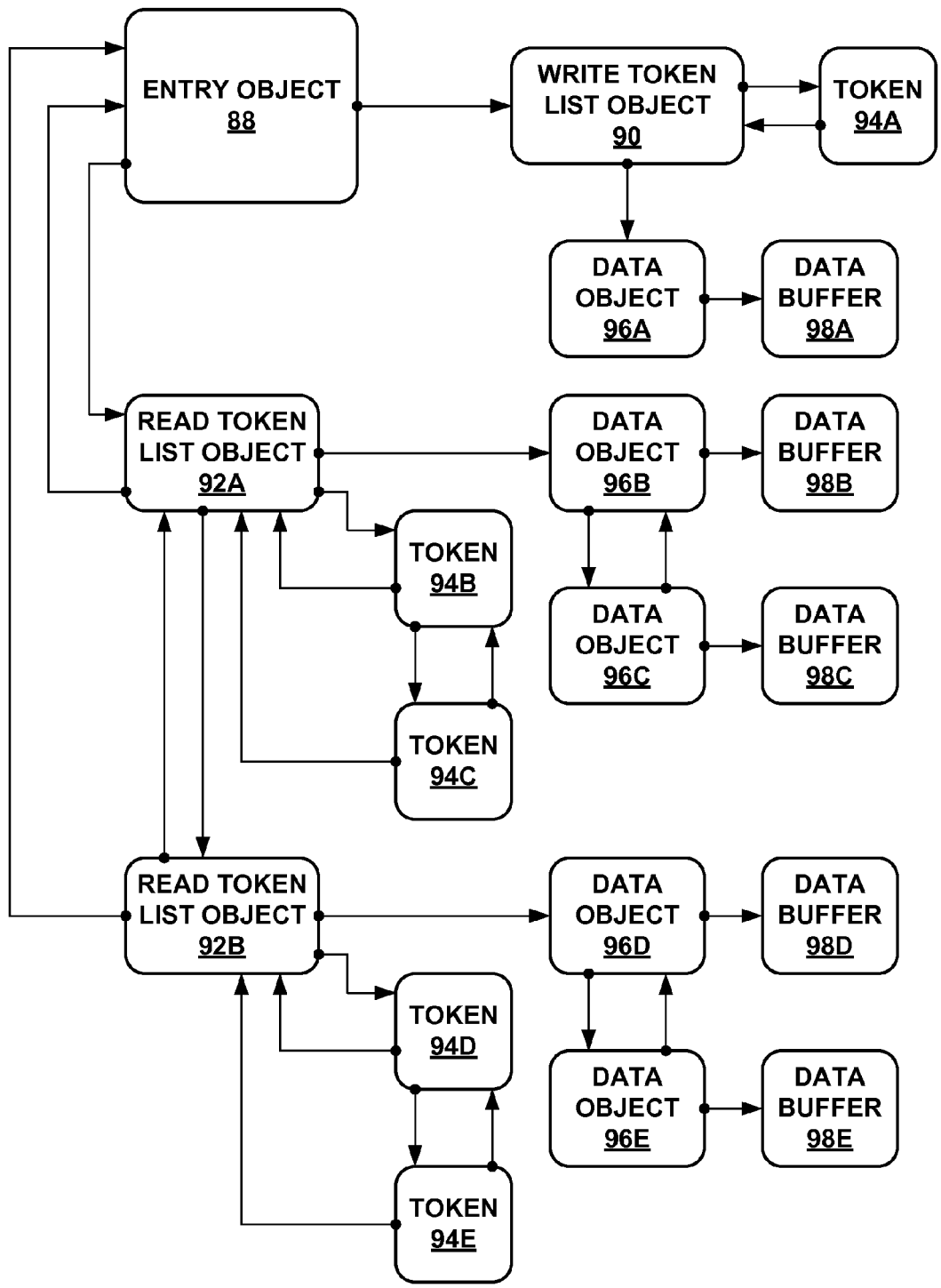
FIG. 6 is block diagram illustrating an exemplary entry object stored within a named memory map region that provides for simultaneous storing and transmitting of multiple versions of requested content.

FIG. 6 is block diagram illustrating an exemplary entry object 88 stored within a named memory map region, such as named memory map region 42 of FIG. 5, that provides for simultaneous storing and transmitting of different historical versions of requested content. As shown in FIG. 6, entry object 88 comprises a first pointer to a write token list object 90, and a read token list object 92A. Read token list object 92A also comprises a pointer to read token list object 92B, thereby forming a read token list. While various objects are discussed in reference to lists, these various objects may be organized in accordance with any data structure, such as a tree, hash table, and a queue, and the invention should not be limited as such.

Write token list object 90 comprises a first pointer to token 94A and a second pointer to data object 96A. Token 94A serve as a reference to write token list object 90 and may enable a cache daemon server engine, such as cache daemon server engine 38, to write a first version to a data buffer 98A on the behalf of requesting client devices, such as client devices 30, as described below. Data object 96A may be similar to data objects 84 of FIG. 5 and, similarly, comprise a pointer to data buffer 98A, which may store content of a first version.

Read token list objects 92 each comprise pointers to a respective token list, in which the first token list comprises tokens 94B, 94C and the second token list comprises tokens 94D, 94E. Cache 34 may organize read token list objects 92 such that read token list object 92A references a newer version of the same content than read token list object 92B. Read token list objects 92 also each comprise pointers to data object lists, in which the first data object list comprises data objects 96B, 96C and the second data object list comprises data object 96D, 96E. Each of data objects 96B-96E comprises pointers to respective data buffers 98B-98E, similar to data objects 84. Similar to token 94A, tokens 94B-94E serve as a reference to respective read token objects 92A and may enable requesting cache clients 30 to read content stored to respective data buffers 98B-98E.

Initially, only one version of the same content may reside within cache 34; however, upon receiving a request for this content, the requesting cache client 30 may determine whether a newer version of the content resides on an appropriate network server. For example, the requesting cache client 30 may request information pertaining to the content stored on the network server, such as the size of the content file, and may further request information pertaining to the content stored in cache 34, such as the size of the file of the content stored to the cache, via a cache access request directed to cache daemon server engine 38. The requesting cache client 30 may compare these two forms of information to determine whether a new version exists.

In the event that the requesting cache client 30 determines that the appropriate network server does not store a new version, the requesting cache client 30 requests access to cache 34 via a cache storage API, such as cache storage API 36, so as to read the content from cache 34. Cache daemon server engine 38 receives the cache access request and issues a corresponding query directing cache 34 to return a reference to the appropriate object that references the newest version of the requested content. Cache 34 complies with this query by creating a new token, such as token 94C, that references read token list object 92A and returning token 94C to cache daemon server engine 38. Cache daemon server engine 38 utilizes token 94C to read the newest version of content stored in data buffers 98B, 98C, and forwards this content to the requesting cache clients 30. Upon receiving this content, the requesting cache clients 30 forward the content to software applications 28 residing on respective requesting client devices 24.

As illustrated in FIG. 6, other of cache clients 30 may have previously requested content prior to an update to the content, and cache 34 may store this first version of content in data buffers 98D, 98E. During these previous requests, cache 34 may create and return the contents of the data buffers 98D, 98E associated with tokens 94D, 94E to these other cache clients 30. Simultaneous to these first version reads, cache 34 provides for the storing of a second, newer version of the content, and may create and return tokens 94B, 94C, as described above, to facilitate the simultaneous reading of this second or newer version of the content stored in data buffers 98B, 98C.

In the event that the requesting cache client 30 determines that the network server stores a third and yet newer version of the requested content, the requesting cache client 30 may download this third version, possibly encode the third version into an encoding acceptable by the requesting application, such as one of applications 28, and forward the possibly encoded content to the requesting application 28. Cache client 30 may simultaneously request access to cache 34 via cache messages to cache daemon server engine 38, which may write the third version to cache 34 via a cache storage API, such as cache storage API 36, on behalf of the requesting cache clients 30. Cache daemon server engine 38 receives the request and issues a query to cache 34, which, as described above, may create new objects and allocate the necessary data buffers based on the query. Cache 34 may instantiate token 94A to reference write token list object 90 and return token 94A to the cache daemon server engine 38.

Upon receiving token 94A, the requesting cache clients 30 may transmit the content to cache daemon server engine 38, which simultaneously writes the third version of the content to data buffer 98A on behalf of the requesting cache clients 30, while reading the first version from data buffers 98D, 98E and the second version from data buffers 98B, 98C. Upon completing the write of the third version, cache 34 may via cache daemon server engine 38 remove token 94A and make a determination as to whether to reorganize data object 96A and its respective data buffer 98A based on the number of tokens currently referencing write token list object 90. In this example, after removing token 94A, no other tokens currently reference write token list object 90, and, therefore, cache 34 may reorganize data object 96A and its respective data buffer 98A by creating another read token list object, similar to read token list objects 92, that references data object 96A and removing write token list object 90. Cache 34 may organize this newly created read token list object so that it comes before read token list object 92A and, therefore, represents that the newly created read token list references a newer version of the content than that referenced by read token list object 92A.

Similarly, cache 34 may perform a similar reorganization procedure with respect to read token list objects 92. After the other of cache clients 30 complete their reads of the first or second version of the content stored to respective data buffers 98B, 98C and data buffers 98D, 98E, cache 34 may remove their respective tokens that reference read token list objects 92 respectively. If no tokens reference the respective read token list objects 92, cache 34 may remove all the data structures directly and indirectly referenced by read token list objects 92, and return the respective data buffers to buffer allocator 68 for reuse. However, cache 34 may not remove read token list object 92A and all data structures directly and indirectly referenced, if cache 34 determines that the removal of one of read token list objects 92 would remove the newest version of the content currently readable from the cache.

For example, cache daemon server engine 38 may finish reading the second version of the content stored to data buffers 98B, 98C on behalf of two of cache clients 30, and cache 34 may remove both of tokens 94B, 94C via interactions with cache daemon server engine 38 in accordance with cache storage API 36 that was previously assigned to these two of cache clients 30. Upon removal of tokens 94B, 94C, cache 34 may determine that no tokens currently reference read token list object list; however, cache daemon server engine 38 may not remove read token list object 92A because it references the newest version of the content currently readable in the cache. As illustrated in FIG. 6, cache 34 has not yet reorganized the third version such that it is readily readable, as described above. Thus, cache 34 may not cause cache daemon server engine 38 to remove read token list object 92A. However, should cache daemon server engine 38 remove tokens 94D, 94E, cache 34 may determine by way of the organization of the read token list object chain that read token list object 92B references a first and older version of the content than that referenced by read token list object 92A. Thus, cache 34 may return data buffers 98D, 98E to buffer allocator 68 for reuse and remove data objects 96D, 96E and read token list object 92B. In this manner, cache 34 stores multiple versions of the same content and seamlessly services content requests to transparently provide these multiple version of the same content to the requesting cache clients 30.

Figure 7:
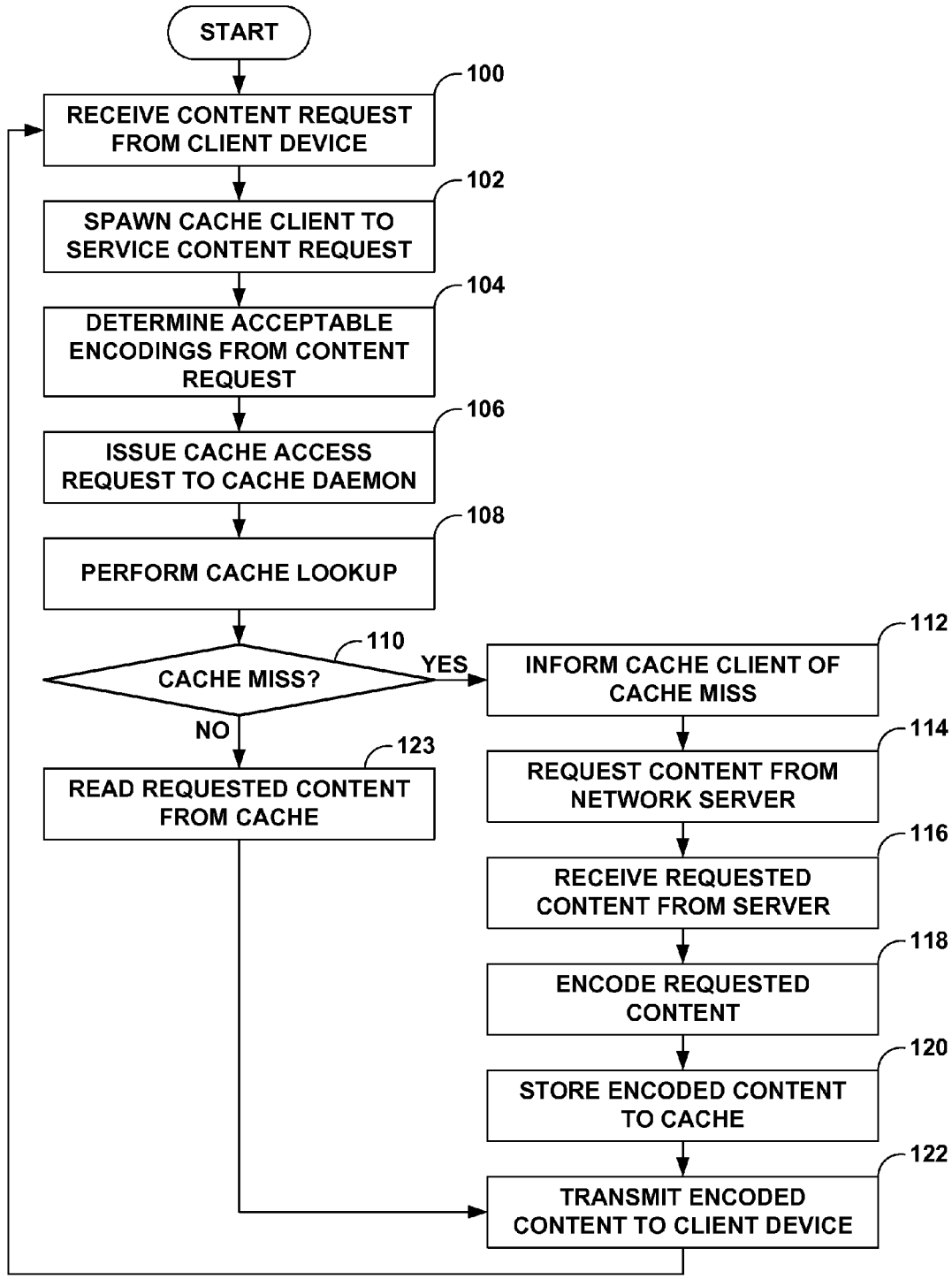
FIG. 7 is a flowchart illustrating exemplary operation of a network acceleration device in accordance with the principles of the invention.

FIG. 7 is a flowchart illustrating exemplary operation of a network acceleration device, such as network acceleration device 26 of FIG. 2, in accordance with the principles of the invention. Although described in reference to FIG. 2, the principles of the invention may apply to any of the network devices listed above, and the invention should not be limited as such.

Initially, an application, such as software applications 28 of client device 24A (FIG. 2), transmits a content request to a network acceleration device, such as network acceleration device 26 (100). Network acceleration device 26 spawns a new cache client or, in some embodiments, utilizes an existing cache client, such as cache client 30A, to service the content request (102). Cache client 30A determines acceptable encodings that the requesting applications 28 may accept, and issues cache access request to cache daemon server engine 38 which in turn formulates queries in accordance with cache storage API 36 in order to determine whether the requested content resides within cache 34, as described above (104, 106). The query, in effect, causes cache 34 to perform cache lookup, and the query may specify the particular content and acceptable encodings, as described in the cache access request (108). The query may identify the content by including a key to the content based on information contained within the content request, such as an HTTP address and an encoding. Cache 34 may respond to the cache lookup query in one of two ways.

If the requested content does not reside within cache 34, i.e., a cache miss ("YES" branch 110), cache daemon server engine 38 may inform cache client 30A of the cache miss, and cache client 30A may request the content from an appropriate network server, such as one of network servers 16 of FIG. 1 (112, 114). In response to the server request for the content, cache client 30A receives the requested content form the appropriate network server and encodes the requested content to one of the predetermined acceptable encodings, such as PZIP, GZIP, or Deflate, as described above (116, 118). Next, cache client 30A again issues a cache access request to cache daemon server engine 38 in order to store the encoded content to cache 34, as described above (120). Simultaneously, cache client 30A may transmit the encoded content to software applications 28 of client 24A, thereby completing the transaction (122).

If the requested content resides within cache 34, i.e., a cache hit ("NO" branch, 110), cache 34 may begin transmitting the requested content to cache daemon server engine 38, which, in turn, transmits the requested content to cache client 30A (123). Cache client 30A, upon receiving the content, transmits the content to the requesting software applications 28 (122).

Upon servicing this content request, various applications may continue to transmit content requests, and network acceleration device 24 may continue to service these requests, as represented by the arrow from 122 to 100. While servicing these content requests, cache daemon server engine 38 may store additional encodings of content previously stored to cache 34, resulting in storage of multiple encodings of identical content to cache 34. In this manner, cache 34 may store the multiple encodings to facilitate a decrease in download speeds at the client device because typically the encodings are of a smaller size than the natural encoding. Thus, client devices, such as client devices 24, may more quickly download the encoded content than the natural encoding of the content.

Figure 8:
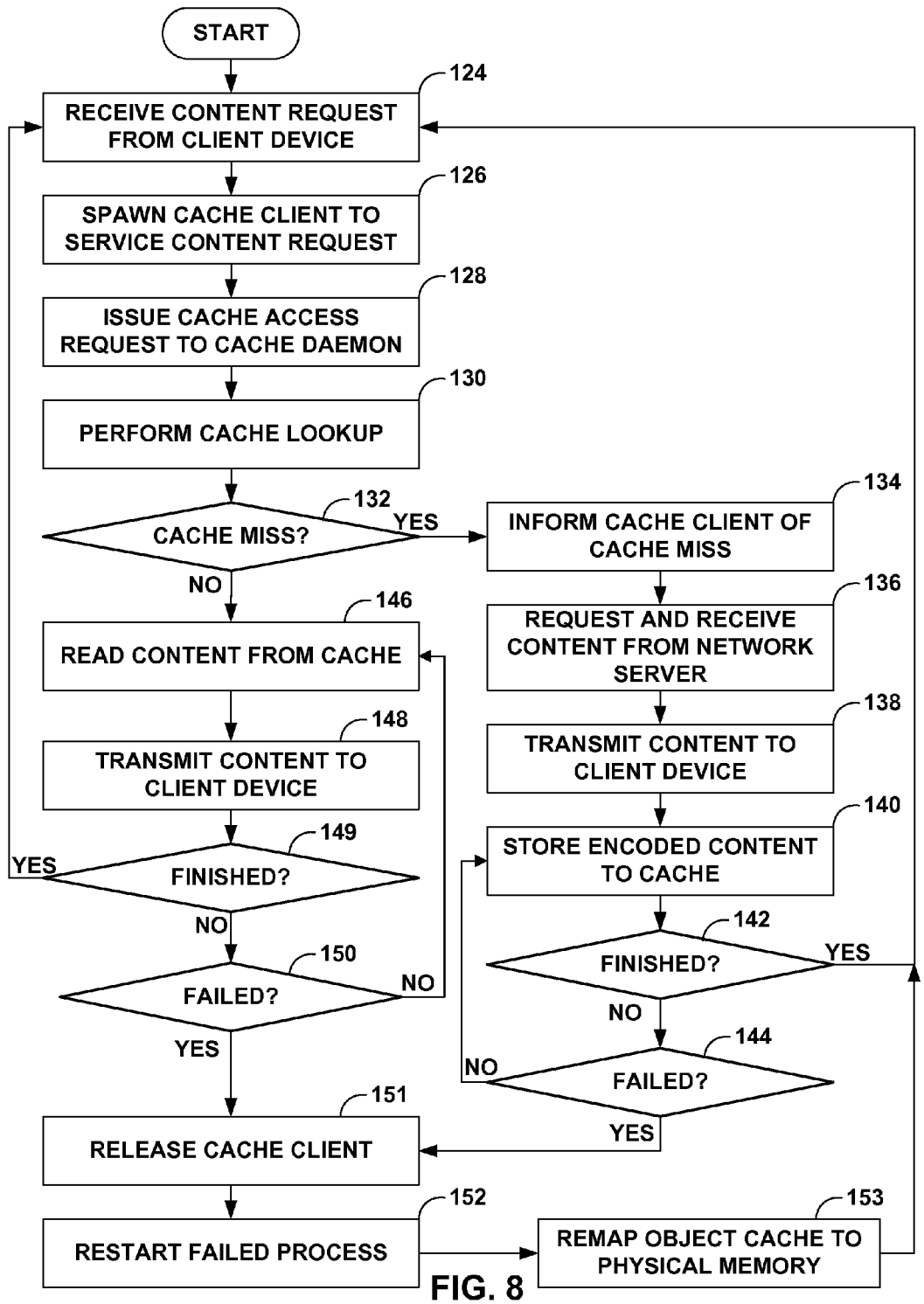
FIG. 8 is a flowchart illustrating exemplary operation of a software process that maintains the integrity of content stored to a cache despite failure of a client connection while accessing the cache.

FIG. 8 is a flowchart illustrating exemplary operation of a software process, such as cache daemon 32 of FIG. 2, that maintains the integrity of content stored to a cache, such as cache 34, despite failure of the software process while accessing the cache. While discussed in reference to network acceleration device 26 of FIG. 2, the principles of the invention may apply to any network device comprising a cache.

Initially, as described above, network acceleration device 26 receives a content request from an application, such as software applications 28, and spawns or utilizes an existing cache client, such as cache client 30A (124, 126). Cache client 30A issues a cache access request via cache messages formulated in accordance with a cache message protocol to cache daemon server engine 38 of cache daemon 32, whereupon receiving the request, cache daemon server engine 38 performs a cache lookup, as discussed above (128, 130). If cache 34 determines that the requested content does not reside within cache 34, cache 34 responds to the lookup by indicating a cache miss ("YES" branch 132). However, if cache 34 determines that the requested content resides within cache 34, cache 34 responds to the cache lookup by indicating a cache hit ("NO" branch 132).

In response to a cache miss, cache daemon server engine 38 informs cache client 30A of the cache miss, and, in response, cache client 30A requests and receives the content from an appropriate network server, as described above (134, 136). Upon receiving the requested content from the network server, cache client 30A begins to transmit the received content to the requesting client device 24 (138). Cache client 30A also simultaneously stores the requested content to cache 34 by issuing a cache access request via the cache daemon server engine 38 which in turn writes the downloaded content to cache 34 via cache storage API 36, as described above (140). Cache 34 may continue to store information until either all the information has been stored ("YES" branch 142) or until a process executing within network acceleration device 26, such as cache daemon 32, fails ("YES" branch 144).

In response to a cache hit, cache 34 allows cache client 30A to read the requested content from cache 34, and, upon reading a portion of the content, cache client 30A transmits this portion of the requested content to software applications 28 of client device 24A (146, 148). If cache 34 successfully finishes reading the requested content, network acceleration device 26 may continue to receive content requests ("YES" branch 149, 124). If cache client 30A is not finished reading the requested content, and no processes executing within network acceleration device 26 fail during this read, cache client 30A may continue to read the content from cache 34 ("NO" branch 149, "NO" branch 150, 146).

In the event that cache daemon 32, for example, fails either while storing content to cache 34 ("YES" branch 144) or reading content from cache 34 ("YES" branch 150), network acceleration device 26, as described above, releases cache client 30A, restarts the failed process, e.g., cache daemon 32, and remaps object cache 44 so as to reference the same underlying physical memory as before the crash (151, 152, 153).

In some embodiments, network acceleration device 26 does not release cache client 30A when the failed process prevented a cache write but, upon restart of the failed process, allows cache client 30A to continue to download the content and store the requested content to cache 34 via cache daemon server engine 38. In these embodiments, cache client 30A may continue to store the requested content upon determining that a process repeatedly fails during repeat attempts to cache this content, thereby preventing the requesting client devices 24 from receiving the content. Thus, to prevent reoccurring failure while storing this content, cache client 30A may continue to store this content via cache daemon server engine 38 so that the content is available the next time the requesting client device 24 requests the content, which may enable download of the content despite repeated failures within network acceleration device 26.

Figure 9:
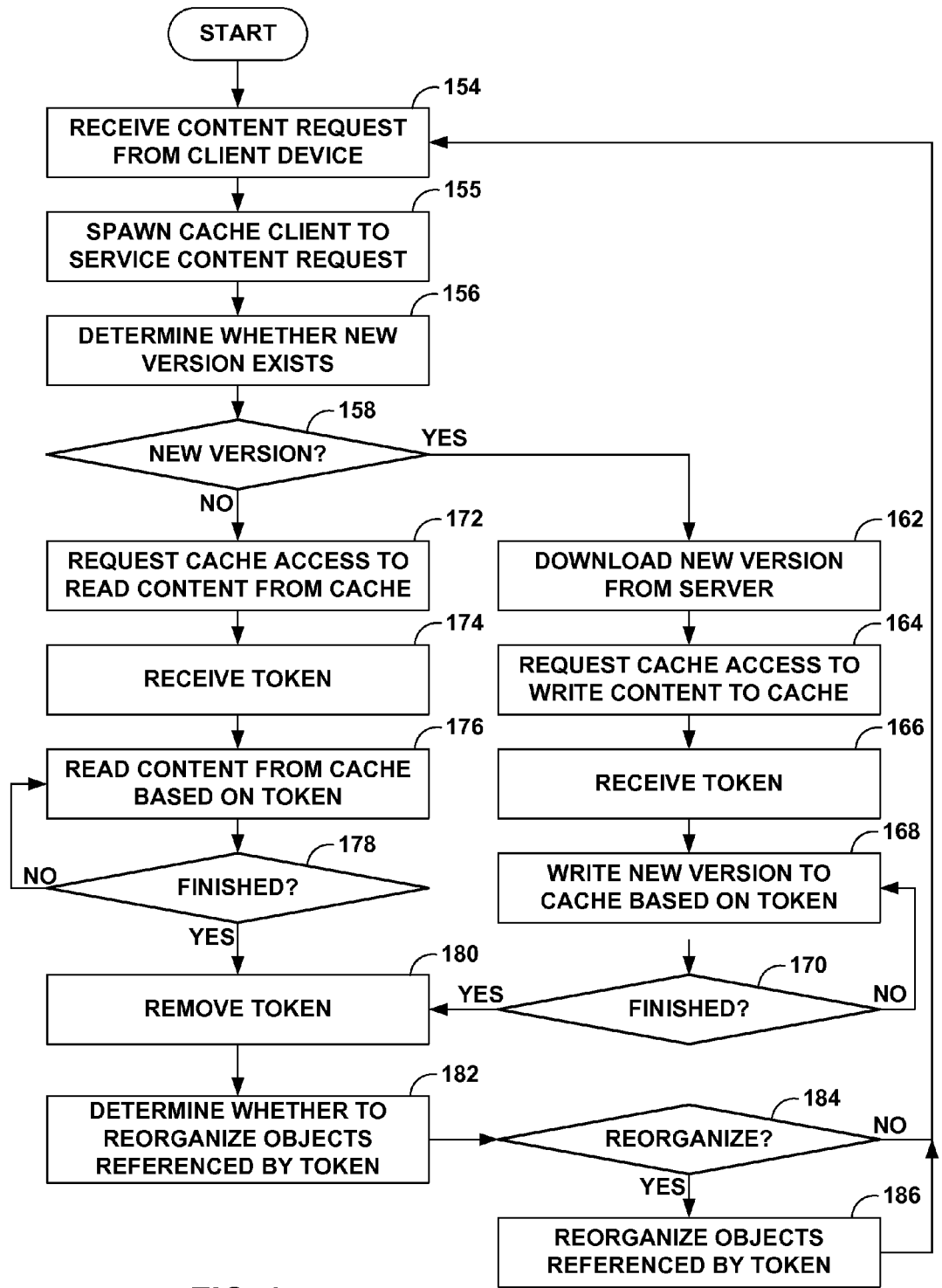
FIG. 9 is a flowchart illustrating exemplary operation of a software process that stores multiple versions of network content within a cache in accordance with the principles of the invention.

FIG. 9 is a flowchart illustrating exemplary operation of a software process, such as cache daemon 32 of FIG. 2, that stores multiple versions of network content within a cache, such as cache 34, in accordance with the principles of the invention. While described in reference to FIGS. 2 and 5, the principles of the invention may apply to any of the network devices listed above.

Initially, network acceleration device 26 (FIG. 2) receives a content request from an application, such as software applications 28 of client device 24 and spawns a cache client or, in some embodiments, utilizes an existent cache client, such as cache client 30A, that services the content request (154, 155). Cache client 30A determines whether a new version of the requested content resides on an appropriate network server, as discussed above (156). In determining whether a new version exists, cache client 30A may request access to cache 34, thereby causing cache daemon server engine 38 perform a cache lookup via queries formulated in accordance with cache storage API 36 to determine whether cache 34 stores an existing version of the requested content. If cache 34 stores an existing version, cache client 30A may compare, for example, the file sizes of the content stored to cache 34 to the file size of the content existing on the network server.

If, in the above example, the file sizes differ, cache client 30A may determine that a new version exists on the appropriate network server and download the new version from the appropriate network server ("YES" branch 158, 162). Next, cache client 30A issues a cache access request to cache daemon server engine 38 in order to write the downloaded content to the cache (164). Cache daemon server engine 38 receives the cache access request and causes cache 34 to return a token that cache daemon server engine 38 uses to insert content received from cache client 30A (166). The token may be substantially similar to token 94A of FIG. 6, and may reference a write token list object, such as write token list object 90. As in FIG. 6, other cache sessions may read previous versions of the content, as represented by tokens 94B-94E.

Upon receiving the token, cache daemon server engine 38, on behalf of cache client 30A, writes the requested content to a data buffer, such as data buffer 98A, by referencing first the write token list object 90 via token 94A, second, data object 96A, and third, data buffer 98A (168). As content is received from client 30A, cache daemon server engine 38 may continue to write the new version of the content until finished ("NO" branch 170).

If, in the above example, the file sizes match, cache client 30A determines that the server contains the same version as that stored in cache 34 and issues a cache request to cache daemon server engine 38 in order to read the content from cache 34, as discussed above ("NO" branch 158, 172). Cache daemon server engine 38 causes cache 34 to return a token in response to receiving the cache access request (174). The token may be substantially similar to token 94B and, likewise, references a read token list object, such as read token list object 92A. Cache client 30A next reads the content from cache 34 via the cache daemon server engine 38, which utilizes token 94B to reference data buffers 98B, 98C, as described above (176). Cache daemon 30A may continue to receive the requested content until cache daemon server engine 38 finished reading the requested content from cache 34 ("NO" branch 178).

Upon finishing either the write of the new version of content ("YES" branch 170) or the read of requested content from cache 34 ("YES" branch 178), cache 34 may inform cache daemon server engine 38 that it is finished, and cache daemon server engine 38 may remove the token from either write token list object 90 or read token list object 92A, respectively (180). In either event, cache 34 determines whether to reorganize objects previously referenced by the token (182). If the token was used for writing to cache 34, cache 34 determines that reorganization is necessary and reorganizes the referenced data object and associated data buffer by moving them to the front of the read token list object chain ("YES" branch 184, 186). If the token was used for reading content from cache 34, cache 34 may determine to reorganize the objects based on the number of tokens assigned to each of the read token list objects (182).

If no tokens are associated with a particular read token list object, cache 34 may reorganize the objects by removing the data objects and data buffers associated with the particular read token list object, but only if the read token list object references an older version and another read token list object references a newer version ("YES" branch 184, 186). For example, if read token list object 90B was not referenced by any tokens, cache 34 may remove read token list object 92B because it references an older version of content than read token list object 92A. If no reorganization is necessary or upon finishing reorganization of the objects, network acceleration device 26 may continue to receive content requests (154). In this manner, cache 34 may store multiple versions of content and seamlessly and transparently transmit the multiple versions to client devices, such as client devices 24.

Figure 10:
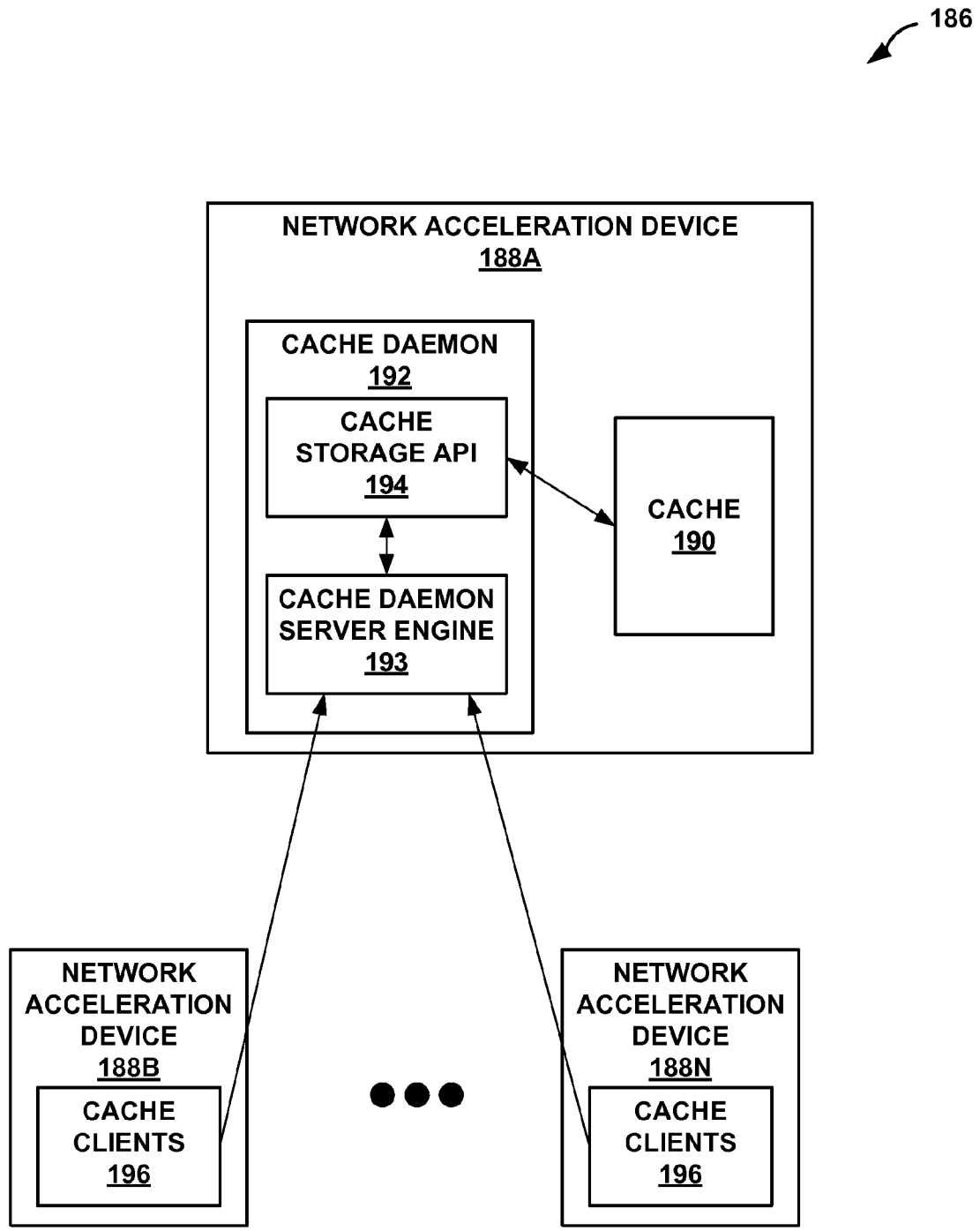
FIG. 10 is a block diagram illustrating another exemplary network system in which a cluster of network acceleration devices operate in accordance with the principles of the invention.

FIG. 10 is a block diagram illustrating another exemplary network system 186 in which a cluster of network acceleration devices 188A-188N operate in accordance with the principles of the invention. Network system 186 comprises a network acceleration device 188A, which may be substantially similar to network acceleration device 26 of FIG. 2, and further network acceleration devices 188B-188N. Network acceleration device 188A differs from network acceleration devices 188B-188N in that network acceleration device 188A comprises a cache 190 while network acceleration devices 188B-188N do not comprise a cache.

As well as comprising cache 190, network acceleration device 188A includes a cache daemon 192 that provides a cache daemon server engine 193 and a cache storage API 194, similar to cache daemon 32. Each of network acceleration devices 188B-188N comprises respective cache clients 196 that their respective network acceleration devices 188B-188N have spawned in response to receiving content requests from client devices not shown in FIG. 10. Each of cache clients 196 may communicate with cache daemon 192 via cache daemon server engine 193. Cache daemon server engine 193 may utilize a cache message protocol that comprises a network-based communication protocol, e.g., the transport control protocol (TCP) or user datagram protocol (UDP), so as to allow network acceleration devices 188B-188N to treat network acceleration device 188A as a target session. Moreover, a TCP-based or UDP-based cache message protocol may enable cache 190 to act as a sharable data store because cache daemon server engine 193 need not realize that cache clients 196 are remote to network acceleration device 188A. In other words, cache daemon server engine 193 may allow cache 190 to transparently service requests from both local and remote cache clients 196. Although not illustrated in FIG. 10, each of network acceleration devices 188A-188N may couple to client devices, such as client devices 24 of FIG. 2, and may receive content requests from their respectively coupled or shared client devices.

Upon receiving content requests, network acceleration devices 188B-188N spawn or, in some embodiments, utilize existing cache clients 196 to service these content requests. Cache clients 196 may issue cache access requests, i.e., a cache message, to cache daemon 192 via cache daemon server engine 193 using the TCP-based cache message protocol. Cache daemon server engine 193 receives the cache access request and performs a cache lookup via cache storage API 194, as described above. In this respect, network acceleration devices 188B-188N represent clients of network acceleration device 188A and network acceleration device 188A represents a server of cached content inserted and maintained by the cluster of network acceleration devices.

Cache 190 determines whether the requested content resides within cache 190, and may perform the process described above to return the requested content to the requesting cache clients 196 via a response cache message, which cache daemon server engine 193 formulates in accordance with the TCP-based cache message protocol. Cache daemon 192 returns the requested content via cache daemon server engine 193 to the requesting cache clients 196 of their respective network acceleration devices 188B-188N. In this manner, network acceleration device 188A may share cache 190 among a cluster of network acceleration devices 188B-188N, thereby reducing the cost associated with network acceleration devices 188B-188N because network acceleration devices 188B-188N need not include a cache but may still provide cache functionality. Moreover, any individual one of network acceleration devices 188 benefit from content previously downloaded and stored within cache 190 by another network acceleration device.

Figure 11:
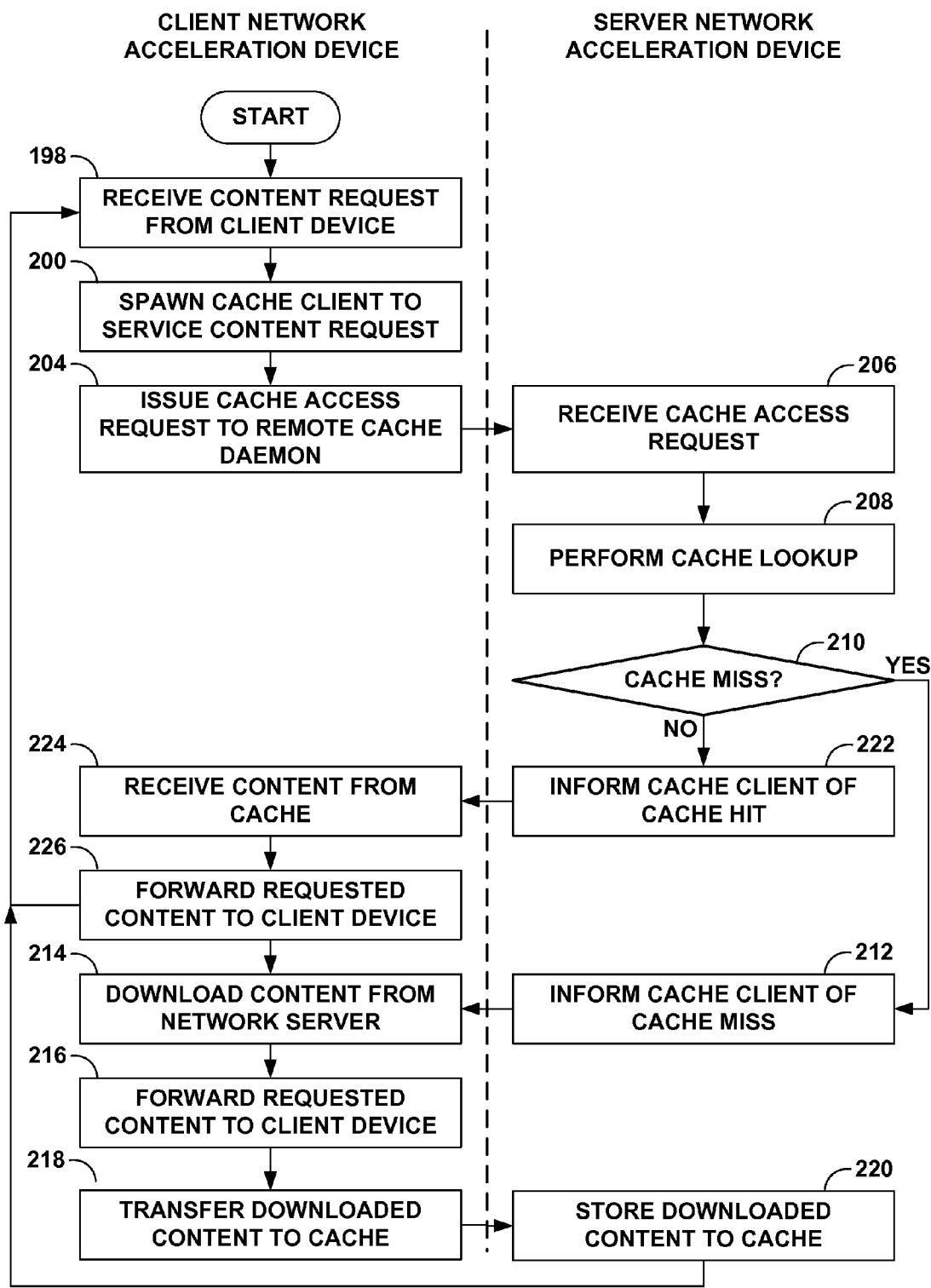
FIG. 11 is a flowchart illustrating exemplary operation of a network acceleration device that manages a shared cache for the cluster of network acceleration devices of FIG. 10.

FIG. 11 is a flowchart illustrating exemplary operation of a network acceleration device 188A that manages a shared cache for a cluster of network acceleration devices 188B-188N of FIG. 10. For purposes of illustration, FIG. 11 is discussed in reference to network acceleration devices 188A-188N of FIG. 10; however, the principles of the invention may apply to any of the network devices listed above.

Initially, a client network acceleration device, such as one of network acceleration devices 188B-188N, receives a content request from a client device, such as client device 24A of FIG. 2, and spawns or, in some embodiments, utilizes an existing cache client, such as one of cache clients 196 to service the received content request (198, 200). One of cache clients 196 of, for example, network acceleration device 188B, upon receiving the content request, issues a cache access request to cache daemon 192 of network acceleration device 188A via a network communication protocol to cache daemon server engine 193 (204). Cache daemon server engine 193 receives the cache access request via the network communication protocol, e.g., the TCP or UDP-based cache message protocol discussed above, and performs a cache lookup via cache storage API 194 based on cache access request, as described above (206, 208). As further described above, cache 190 may respond to the cache lookup by informing cache daemon 192 whether a cache hit or a cache miss has occurred.

If a cache miss occurs ("YES" branch 210), cache daemon 192 informs the requesting cache clients 196 of the cache miss, and, upon receiving this notification, the requesting cache clients 196 download the content from an appropriate network server, as described above (212, 214). Once downloaded, the requesting cache client 196 forwards the content to the requesting client device, and, in some embodiments, cache client 196 may first encode the content prior to forwarding it to the requesting client device (216). Simultaneous to forwarding the content, the requesting cache clients 196 may request cache access via cache daemon server engine 193 to write the contents to cache 190, and upon receiving cache access, the requesting cache client 196 transfers the downloaded content to cache 190 via cache daemon server engine 193 (218). Upon receiving the downloaded content, cache daemon 192 stores the content in the manner discussed above via the cache storage API 194 into cache 190.

In response to a cache hit ("NO" branch 210), cache daemon server engine 193 informs the requesting cache clients 196 of the cache hit, whereupon the requesting cache clients 196 receive the content via cache messages from cache daemon server engine 193, which read the content from cache 190 via cache storage API 194 (222, 224). As the content is received from cache 190, the requesting cache clients 196 may forward the requested content to the requesting client device (226). In this manner, cache daemon server engine 193 may facilitate the ability of network acceleration device 188A to share of cache 190 among a cluster of network acceleration devices 188B-188N so as to allow network acceleration device 188B, for example, to benefit from the previous content requests issued by another network acceleration device, such as network acceleration device 188N. Moreover, cache daemon server engine 193 may reduce the cost associated with the cluster of network acceleration devices 188B-188N because they do not incur the additional cost of including a cache but may continue to provide cache functionality.

While shareable cache functionality is described above, cache 190 may include the other principles of the invention discussed above, such as the ability to store multiple encodings and multiple versions of content. Moreover, cache 190 may maintain a quasi-persistent nature by use of a named memory map region, such as named memory map region 42. Thus, while cache daemon server engine 193 may facilitate sharing of cache functionality among multiple network devices, cache 190 may further facilitate decreased download speeds by storing multiple encodings and versions of content, as well as, maintaining a quasi-persistent nature, as described above. Various embodiments of the invention have been described. These and other embodiments are within the scope of the following claims.

The invention claimed is:

1. A network device comprising:
   an in-memory cache that stores content within a named memory region of a physical memory provided by the network device;
   a software process that manages the in-memory cache;
   a cache server executing on the network device having a respective virtual memory space; and
   a cache client process executing on the network device to receive a request for the content from a client device, issue a cache access request to the cache server via a cache message protocol to determine whether the content resides within the cache, download the content from a network server when the content does not reside within the cache, and store the content to the cache upon determining that the content does not reside within the cache,
   wherein the cache server remaps one or more data structures of the virtual memory space to the named memory region of the physical memory in response to a failure to allow access of the content stored in the cache without restoring the content to the cache, and
   wherein the cache server remaps the named memory region by reallocating an object within the named memory region to reference the same physical memory of the cache where the content was stored prior to the failure.

2. The network device of claim 1, further comprising:
   a buffer allocator that allocates at least one object within the named memory region that references unused physical memory of the cache,
   wherein the cache stores the content to the unused physical memory referenced by the object.

3. The network device of claim 1, wherein the cache client process further:
   continues to download the content from the network server after the cache server remaps the named memory region; and
   continues to store the content to the cache via a cache storage API after the cache server remaps the named memory region.

4. The network device of claim 3, wherein the cache server remaps the named memory region by:
   stopping the cache client process from downloading the content from the network server after detecting the failure; and
   releasing the cache client process after detecting the failure.

5. The network device of claim 4, further comprising:
   a second cache client process executing on the network device that receives a request for the content from a second client device after remapping the named memory region, issues a cache access request to read the content from the cache, receives the content from the cache in response to the cache access request, and transmits the content received from the cache to the second client device.

6. The network device of claim 1,
   wherein the network device comprises an intermediate network acceleration device located between a client device and a network server, and
   wherein the network device transparently intercepts access requests from the client device to the network server and services the access requests from the cache.

7. The network device of claim 1, wherein the cache server remaps one or more data structures of the virtual memory space to the named memory region of the physical memory in response to a failure of a client session.

8. The network device of claim 1, wherein the cache server remaps one or more data structures of the virtual memory space to the named memory region of the physical memory in response to a failure and restart of the cache server.

* * * * *